(12) United States Patent
Hoss et al.

(10) Patent No.: US 9,395,765 B2
(45) Date of Patent: Jul. 19, 2016

(54) UNIBODY CONSTRUCTION TRIANGULAR CHASSIS

(71) Applicant: Dell Products, LP, Round Rock, TX (US)

(72) Inventors: Shawn P. Hoss, Round Rock, TX (US); Edward D. Knapton, Pflugerville, TX (US); Steven J. Zielnicki, Round Rock, TX (US); Christopher M. Helberg, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/448,086

(22) Filed: Jul. 31, 2014

(65) Prior Publication Data
US 2016/0034005 A1 Feb. 4, 2016

(51) Int. Cl.
*G06F 1/16* (2006.01)
*G06F 1/18* (2006.01)
*B21D 28/00* (2006.01)

(52) U.S. Cl.
CPC ............... *G06F 1/181* (2013.01); *B21D 28/00* (2013.01)

(58) Field of Classification Search
CPC ....................................................... G06F 1/181
See application file for complete search history.

(56) References Cited

U.S. PATENT DOCUMENTS

| D49,524 | S | * | 8/1916 | Andre | ........................ D14/203 |
| 3,727,979 | A | * | 4/1973 | Schier | ..................... A47B 3/12 126/9 A |
| D312,423 | S | * | 11/1990 | Orlinsky | ................... D10/106.1 |
| D317,261 | S | * | 6/1991 | Brown | ........................ D9/782 |
| 5,345,807 | A | | 9/1994 | Butts et al. | |
| 5,369,549 | A | * | 11/1994 | Kopp | ..................... F16M 11/00 220/324 |
| 5,434,566 | A | | 7/1995 | Iwasa et al. | |
| 5,515,040 | A | | 5/1996 | Lee et al. | |
| 5,574,858 | A | | 11/1996 | Witte | |
| 5,790,102 | A | | 8/1998 | Nassimi | |
| 5,909,357 | A | * | 6/1999 | Orr | ........................ G06F 1/16 361/679.46 |
| D418,412 | S | * | 1/2000 | Komatsu | ....................... D9/433 |
| 6,098,184 | A | | 8/2000 | Patterson, Jr. | |
| 6,107,997 | A | | 8/2000 | Ure | |
| 6,135,886 | A | | 10/2000 | Armstrong | |

(Continued)

FOREIGN PATENT DOCUMENTS

WO    WO 2012/112275 A1    8/2012

OTHER PUBLICATIONS

"Wieson's P-Sensor Efficiently Reduce the SAR from Handheld Device," Wireless Application Business Unit, May 14, 2012, 2 pgs., http://www.wieson.com/go/en/wieson/news_show.php?nid=12392& catalog=Product%20News.

(Continued)

*Primary Examiner* — Anthony Q Edwards
(74) *Attorney, Agent, or Firm* — Prol Intellectual Property Law, P.L.L.C.; H. Kenneth Prol

(57) ABSTRACT

A base chassis of an information handling system with a generally triangular profile is formed by connecting a plurality of three-dimensional sheet metal structural elements, wherein at least two of the elements have the same shape and a gusset. The gusset connects two of the structural elements. A plastic chassis assembly may be fitted over the base chassis. One or more handles may also be fitted over the base chassis. They may be located at vertices of the base chassis. Side door covers may be secured by rims on the base chassis.

20 Claims, 11 Drawing Sheets

(56) References Cited

U.S. PATENT DOCUMENTS

| | | | | |
|---|---|---|---|---|
| 6,157,533 A * | 12/2000 | Sallam | | G06F 1/203 361/679.03 |
| 6,166,723 A | 12/2000 | Schena et al. | | |
| D471,892 S * | 3/2003 | Jordan | | D14/212 |
| 6,560,095 B1 * | 5/2003 | Zheng | | A63B 9/00 135/91 |
| 6,587,093 B1 | 7/2003 | Shaw et al. | | |
| D480,705 S * | 10/2003 | Jordan | | D14/212 |
| D497,163 S * | 10/2004 | Andre | | D14/349 |
| D508,491 S * | 8/2005 | Choi | | D14/356 |
| 7,024,625 B2 | 4/2006 | Shali | | |
| D532,780 S * | 11/2006 | Proctor, Jr. | | D14/240 |
| 7,136,045 B2 | 11/2006 | Rosenberg et al. | | |
| 7,151,672 B2 * | 12/2006 | Campbell | | G06F 1/181 174/50.51 |
| D543,180 S * | 5/2007 | Ra | | D14/138 AB |
| 7,710,397 B2 | 5/2010 | Krah et al. | | |
| 7,817,135 B2 | 10/2010 | Shaw et al. | | |
| D640,227 S * | 6/2011 | Wada | | D14/149 |
| 8,035,616 B2 | 10/2011 | Shaw et al. | | |
| 8,188,842 B2 * | 5/2012 | Otsuka | | G08C 17/02 340/12.15 |
| 8,243,018 B2 | 8/2012 | Farag et al. | | |
| 8,405,969 B2 * | 3/2013 | Sullivan | | G06F 1/16 312/208.4 |
| 8,553,400 B2 * | 10/2013 | Moran | | G09F 9/30 340/815.49 |
| 8,577,289 B2 | 11/2013 | Schlub et al. | | |
| 8,662,604 B2 * | 3/2014 | Rajvanshi | | H02G 3/085 312/223.1 |
| 8,894,161 B2 * | 11/2014 | Herreid, II | | A47B 81/002 312/223.2 |
| D734,478 S * | 7/2015 | Labuschagne | | D24/200 |
| D737,250 S * | 8/2015 | Ingham | | D14/218 |
| 2003/0112587 A1 * | 6/2003 | Krause | | H05K 5/062 361/679.02 |
| 2006/0087805 A1 * | 4/2006 | Massih | | G06F 1/181 361/679.02 |
| 2006/0183421 A1 * | 8/2006 | Proctor, Jr. | | H04B 7/15521 455/11.1 |
| 2006/0187011 A1 * | 8/2006 | van der Meer | | B60Q 1/44 340/438 |
| 2006/0262026 A1 * | 11/2006 | Gainey | | H01Q 9/285 343/795 |
| 2007/0072657 A1 * | 3/2007 | Hyun | | H04M 1/0247 455/575.3 |
| 2008/0007905 A1 * | 1/2008 | Wilcox | | G06K 19/07703 361/679.01 |
| 2009/0126450 A1 * | 5/2009 | Su | | H05K 5/04 72/379.2 |
| 2009/0140985 A1 | 6/2009 | Liu | | |
| 2010/0127983 A1 | 5/2010 | Irani et al. | | |
| 2010/0148999 A1 | 6/2010 | Casparian et al. | | |
| 2010/0201626 A1 | 8/2010 | Krah et al. | | |
| 2010/0321301 A1 | 12/2010 | Casparian et al. | | |
| 2013/0122974 A1 * | 5/2013 | Haramein | | A44C 17/02 455/575.1 |
| 2013/0279107 A1 * | 10/2013 | Knopf | | G06F 1/181 361/679.31 |
| 2014/0247554 A1 * | 9/2014 | Sharma | | H05K 7/1432 361/695 |
| 2015/0197182 A1 * | 7/2015 | Jones | | B60Q 1/444 340/908 |

OTHER PUBLICATIONS

"802.11n Demystified—Key considerations for n-abling the Wireless Enterprise," Motorola White Paper, 802 11nDEM_WP_v4_0209, 12 pgs, Feb. 2009, http://www.motorolasolutions.com/web/Business/_Documents/White%20Paper/_Static%20files/802%2011nDEM_WP_v4_0209.pdf.

* cited by examiner

UNIBODY CONSTRUCTION TRIANGULAR CHASSIS

FIELD OF THE DISCLOSURE

The present disclosure relates generally to information handling systems, and more particularly to a unibody construction triangular chassis.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. The chassis of an information handling system may provide a framework for housing the components of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
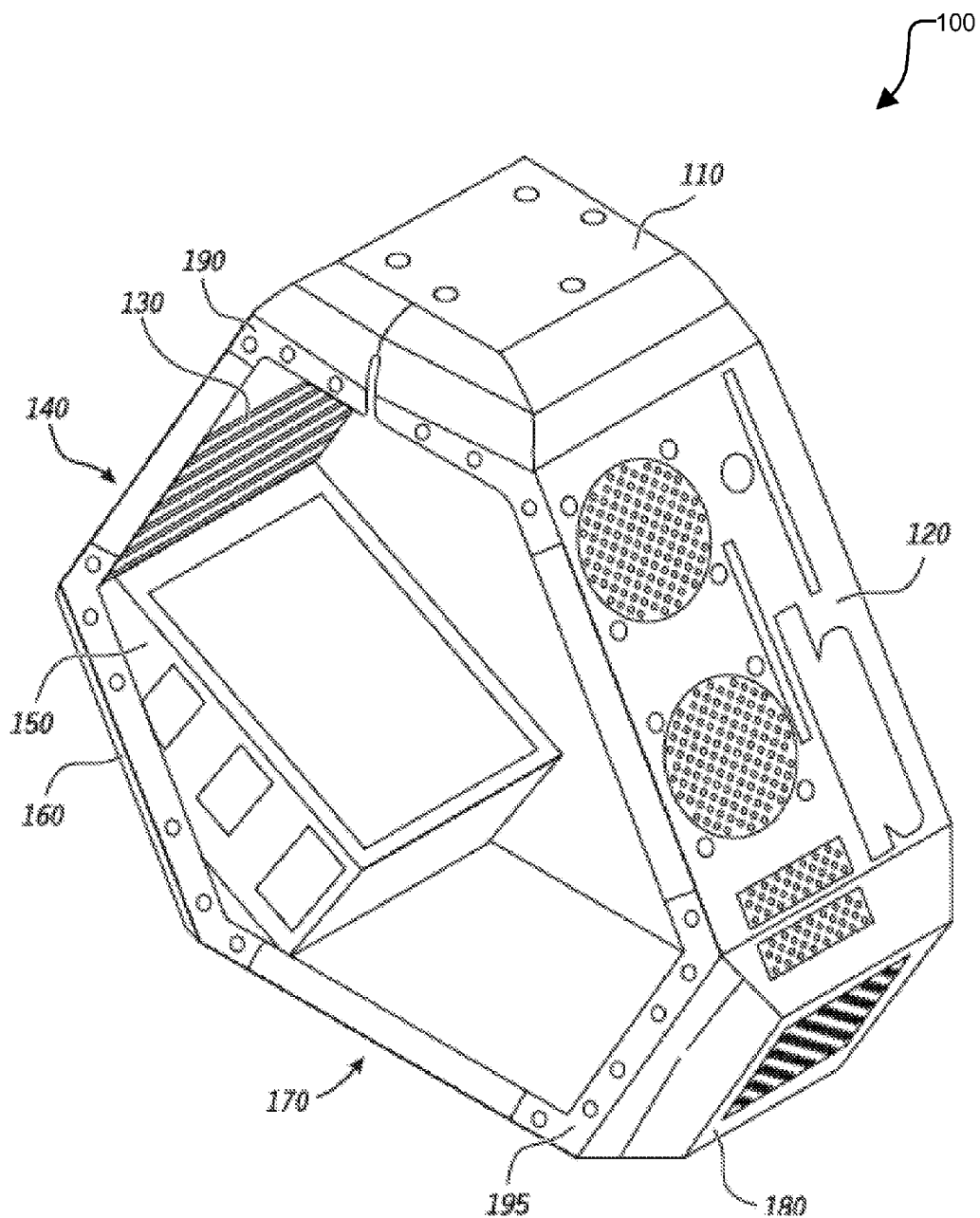
FIG. 1 illustrates a base triangular chassis of an information handling system according to an embodiment of the present disclosure.

FIG. 1 illustrates a base chassis 100 of an information handling system. For purpose of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. Information handling system can also include one or more buses operable to transmit information between the various hardware components.

Base chassis 100 provides the support structure of the information handling system. Base chassis 100 is formed from gussets 110, 160, and 180, sides 120 and 140, and underside 170. Sides 120 and 140 are generally rectangular. Only an edge of gusset 160 and underside 170 is shown in FIG. 1. Attached to base chassis 100 are structure 130 for holding graphics cards and structure 150 for holding a power supply unit. The profile of base chassis 100 from a left-front view is triangular. In the embodiment of FIG. 1, the triangle is equilateral. The vertices of the triangle are chamfered, or squared off. In the embodiment of FIG. 1, the vertices are formed by gussets 110, 160, and 180. The gussets connect the sides and provide rigidity to base chassis 100. Thus, base chassis 100 is formed from three sides and three gussets, one at each chamfered vertex. In FIG. 1, gusset 110 connects sides 120 and 140, gusset 160 connects side 140 and underside 170, and gusset 180 connects side 120 and underside 170. The gussets and sides provide a rim or flange, such as rims 190 and 195. The rims may be used to secure side covers or doors of the chassis of the information handling system. The rims may also provide electromagnetic (EMI) grounding. In some embodiments, the rims may be hexagonal.

In many embodiments, gussets 110, 160, and 180, sides 120, 140, and 170, and other structural elements of base chassis 100 are fabricated from drawn sheet metal. Pressed sheet metal and other materials are contemplated as well. As shown in FIG. 1, the structural elements have a three-dimensional shape. In the embodiment of FIG. 1, base chassis 100 has a unibody construction; that is, base chassis 100 both provides the form of the information handling system and serves as a framework for anchoring components of the information handling system, such as structures 130 and 150. The sheet metal construction may provide EMI shielding. In some embodiments, an EMI door seam and hinge may be incorporated into the chassis walls.

In some embodiments, the rigidity provided by the construction of FIG. 1 may reduce distortion to the chassis from forces applied to it. As a result, components of the information handling system may be protected from the applied forces. This rigidity may, for example, permit rolling the case without injuring internal components. It may also enable a user to remove a door even with the force of the user's hand resting on the chassis. In one experiment, a pulling force of 40 kg applied to two handles (20 kg to each handle) produced a maximum deflection of 1.689 mm. Further, a pressure of 80 kg applied to the chassis produced a maximum deflection of 2.197 mm. In other embodiments, it is contemplated that a pulling force of 40 kg applied to two handles may produce a maximum deflection in the range of 0 to 9 mm, and a pressure of 80 kg applied to the chassis may produce a maximum deflection in the range of 0 to 20 mm.

Figure 2:
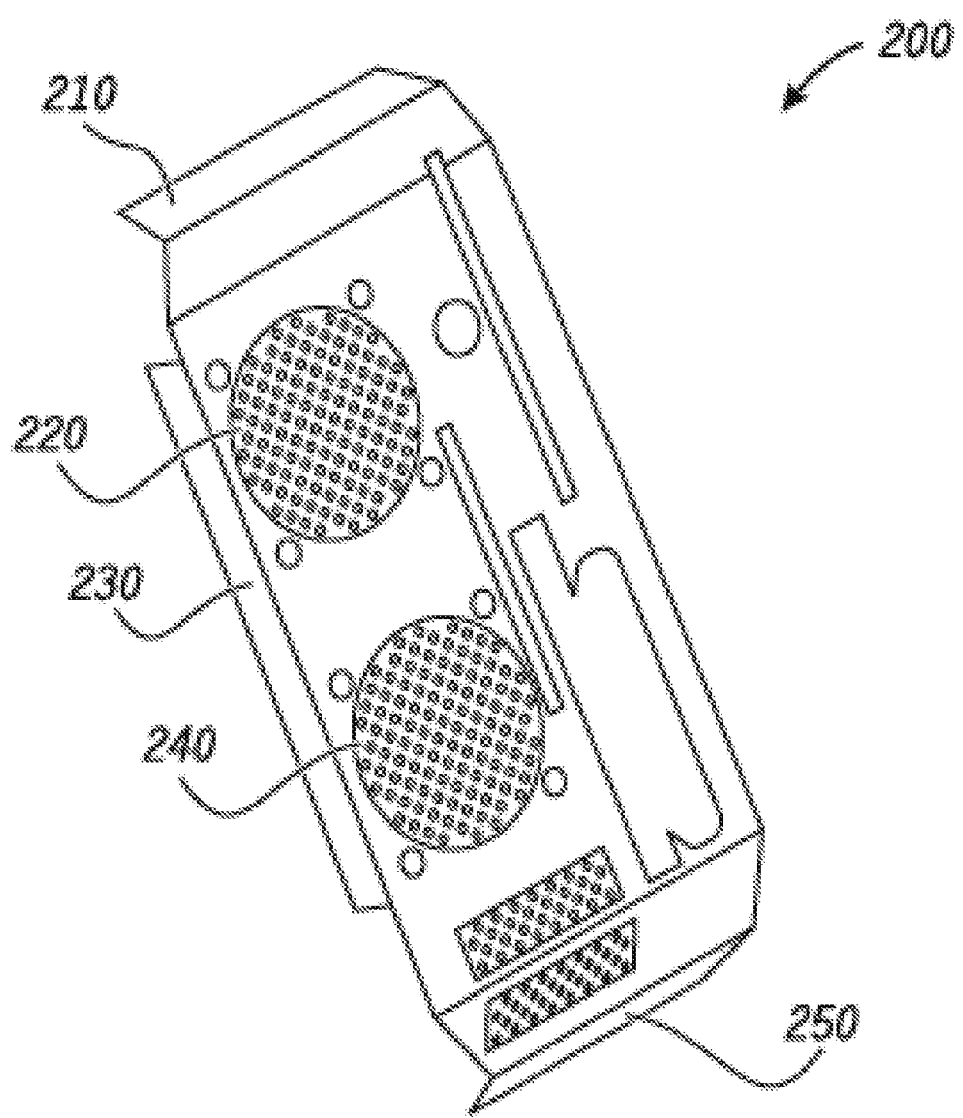
FIG. 2 illustrates a side of the base triangular chassis of an information handling system according to an embodiment of the present disclosure.
Figure 3:
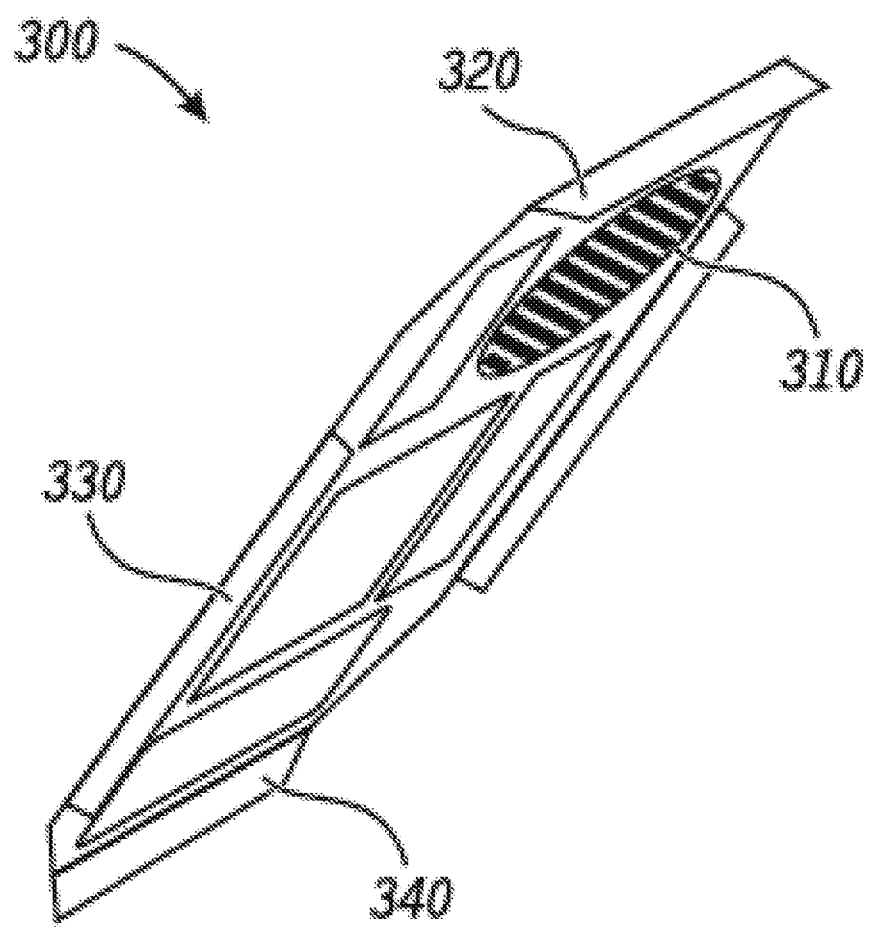
FIG. 3 illustrates another side of the base triangular chassis of an information handling system according to an embodiment of the present disclosure.
Figure 4:
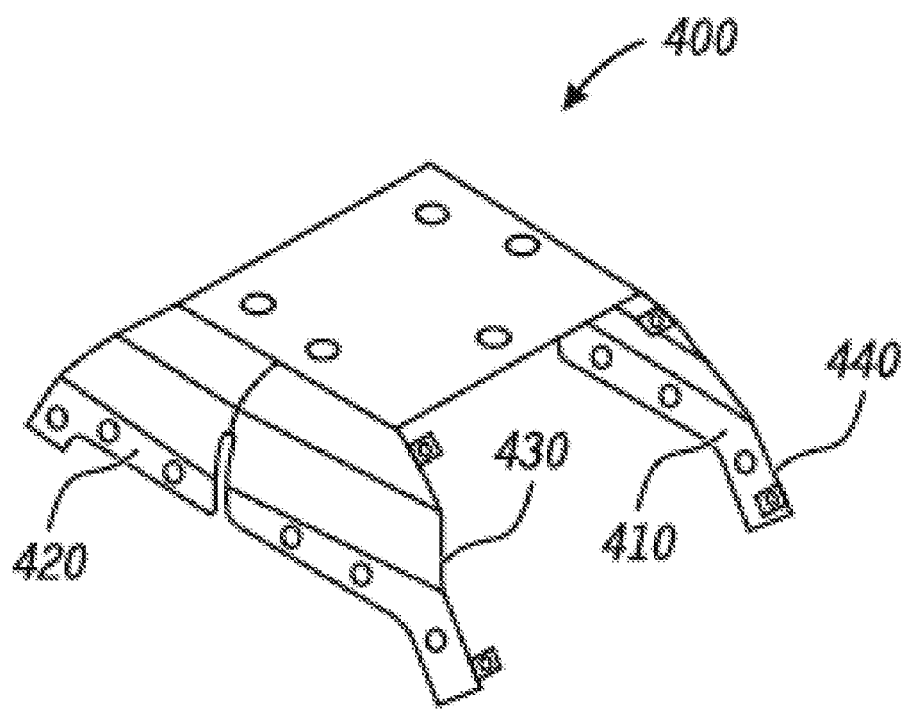
FIG. 4 illustrates a gusset of the base triangular chassis of an information handling system according to an embodiment of the present disclosure.

FIGS. 2-4 provide additional details of the sides and gussets. Side 200 is a detailed view of side 120 of FIG. 1. Side 200 includes ridges 210 and 250, openings 220 and 240, and rim 230. Ridges 210 and 250 may each interlock with a gusset, such as gusset 110 of FIG. 1, to provide rigidity to a chassis of an information handling system. Openings 220 and 240 may be used for ventilation. Rim 230 may help secure a cover or door of an information handling system.

Side 300 of FIG. 3 is a detailed view of side 140 of FIG. 1. Side 300 includes opening 310, ridges 320 and 340, and rim 330. Opening 310 may be used for ventilation. Ridges 320 and 340 may each interlock with a gusset, such as gusset 110 of FIG. 1, to provide rigidity. Rim 330 may help secure a cover or door of an information handling system. The similarity of sides 200 and 300 may simplify the process of fabricating the sides. In some embodiments, for example, a general form may be produced and worked further to produce the differentiated pieces. In the case of sides 200 and 300, for example, a different number of openings may be cut or pressed into the same form to produce the two different shapes. Thus, for example, a standard form may be customized with openings for ventilation or other purposes.

Gusset 400 of FIG. 4 is a detailed view of gusset 110 of FIG. 1. Gusset 400 includes rims 410 and 420 and edges 430 and 440. Rims 410 and 420 may help secure a cover or door of an information handling system. Edges 430 and 440 may interlock with sides, such as sides 120 and 140 of FIG. 1, to form a base chassis of an information handling system. In embodiments of a triangular chassis with chamfered vertices, each of the three vertices may incorporate a gusset. The gussets may be identical or similar, thereby simplifying the process of fabricating the sides. In some embodiments, for example, a different number of openings may be cut or pressed into the same form to produce the two different shapes of gussets.

Figure 5:
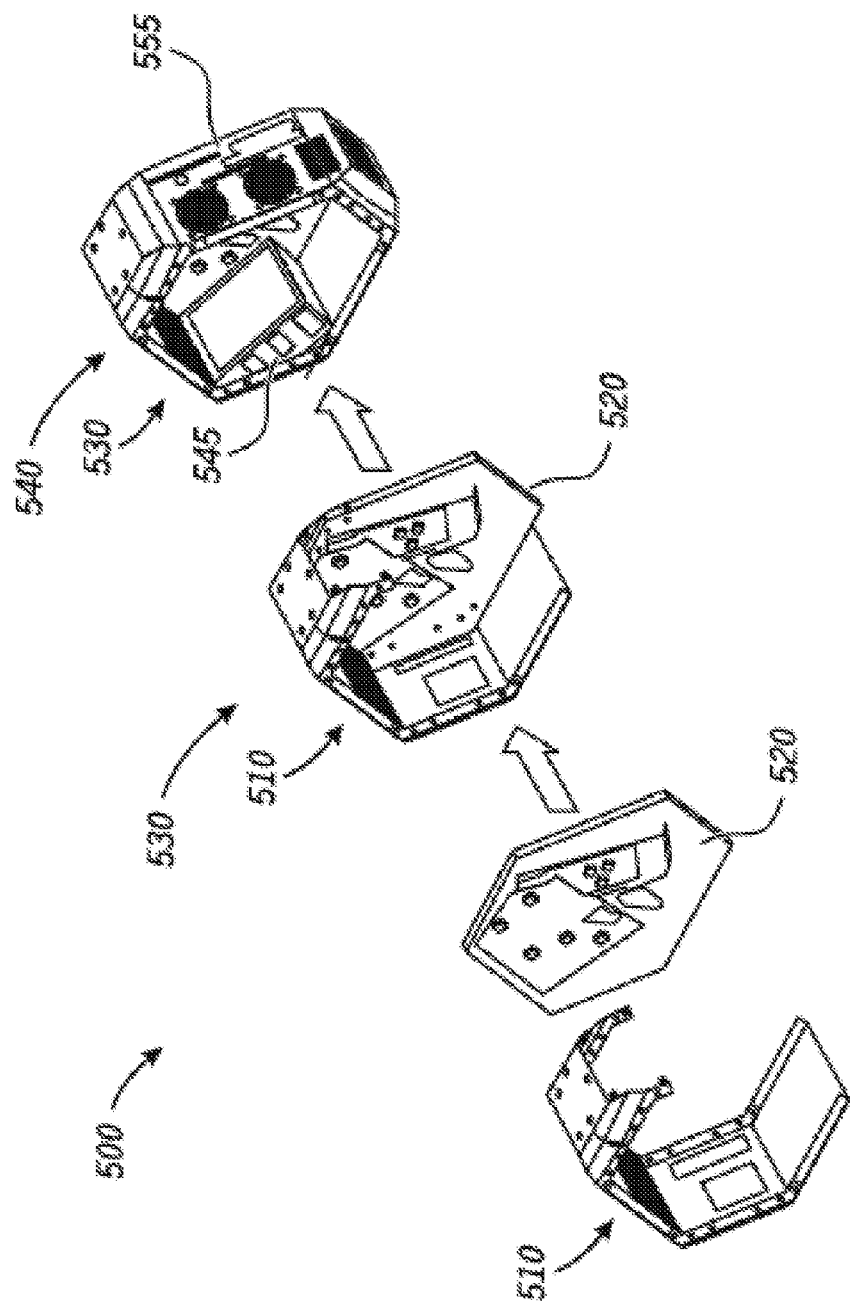
FIG. 5 is a diagram illustrating assembly of a base chassis according to an embodiment of the present disclosure.

FIG. 5 is a diagram illustrating assembly 500 of a base chassis according to an embodiment of the present disclosure. The assembly begins with rear portion of chassis 510. Rear portion 510 includes two sides and two gussets. Partition assembly 520 is a structure for mounting a motherboard and other components, such as memory in some embodiments. Partition assembly 520 may be created separately from rear portion 510. The assembly process continues with joining partition assembly 520 and rear portion 510 to produce chassis portion 530. Chassis portion 530 includes rear portion 510 and partition assembly 520. Chassis portion 540 is created by assembling remaining sheet metal components of the base chassis to chassis portion 530. The remaining portions include the remaining side 555 and a mounting bracket for a power supply unit 545.

Figure 6:
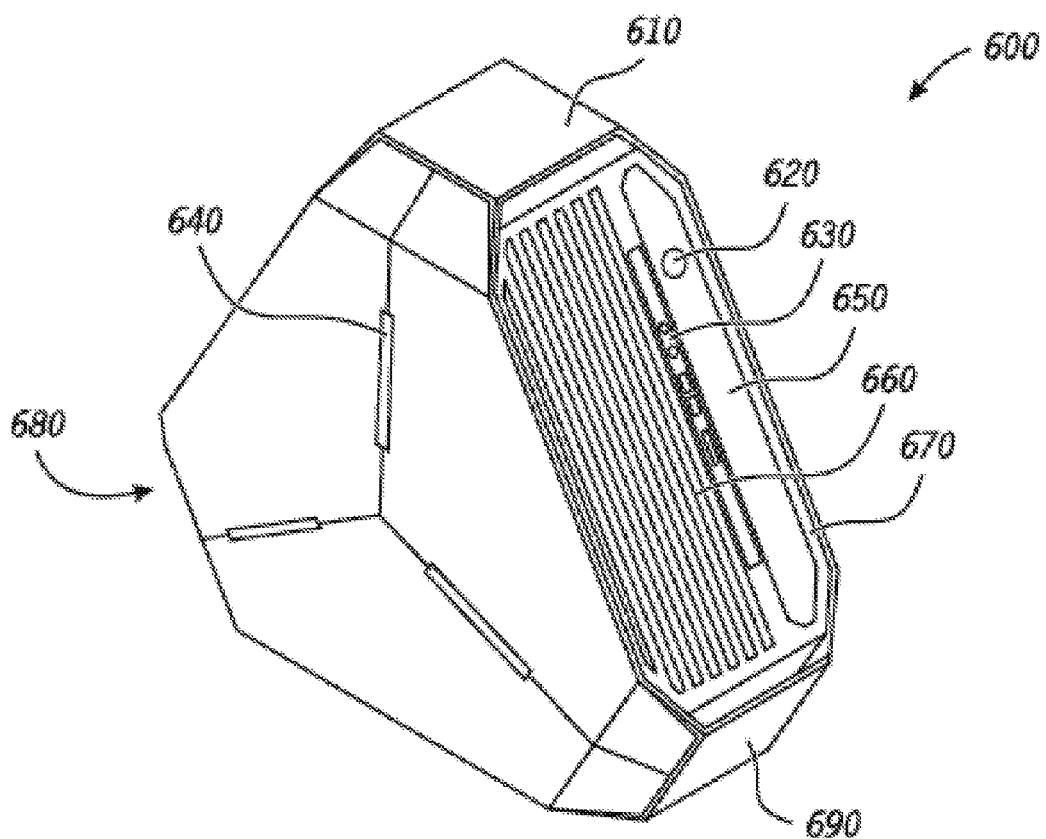
FIG. 6 illustrates a case of an information handling system according to an embodiment of the present disclosure.

FIG. 6 is a block diagram of an exterior of a case 600 of an information handling system. Exterior includes handles 610, 680, and 690, power button 620, front facing I/O 630, lighting 640 and 670, hard disk drive/optical disk drive (HDD/ODD) access door 650, thermal opening 660, handle 680, and handle 690. Case 600 may be constructed by adding a plastic chassis assembly to a base chassis, such as base chassis 100 of FIG. 1. The base chassis may be partially or entirely hidden by the plastic chassis assembly. The plastic chassis assembly may include plastic components placed over each side, such as a front plastic component, a back plastic component, and a bottom plastic component; side covers, and handles.

Figure 7:
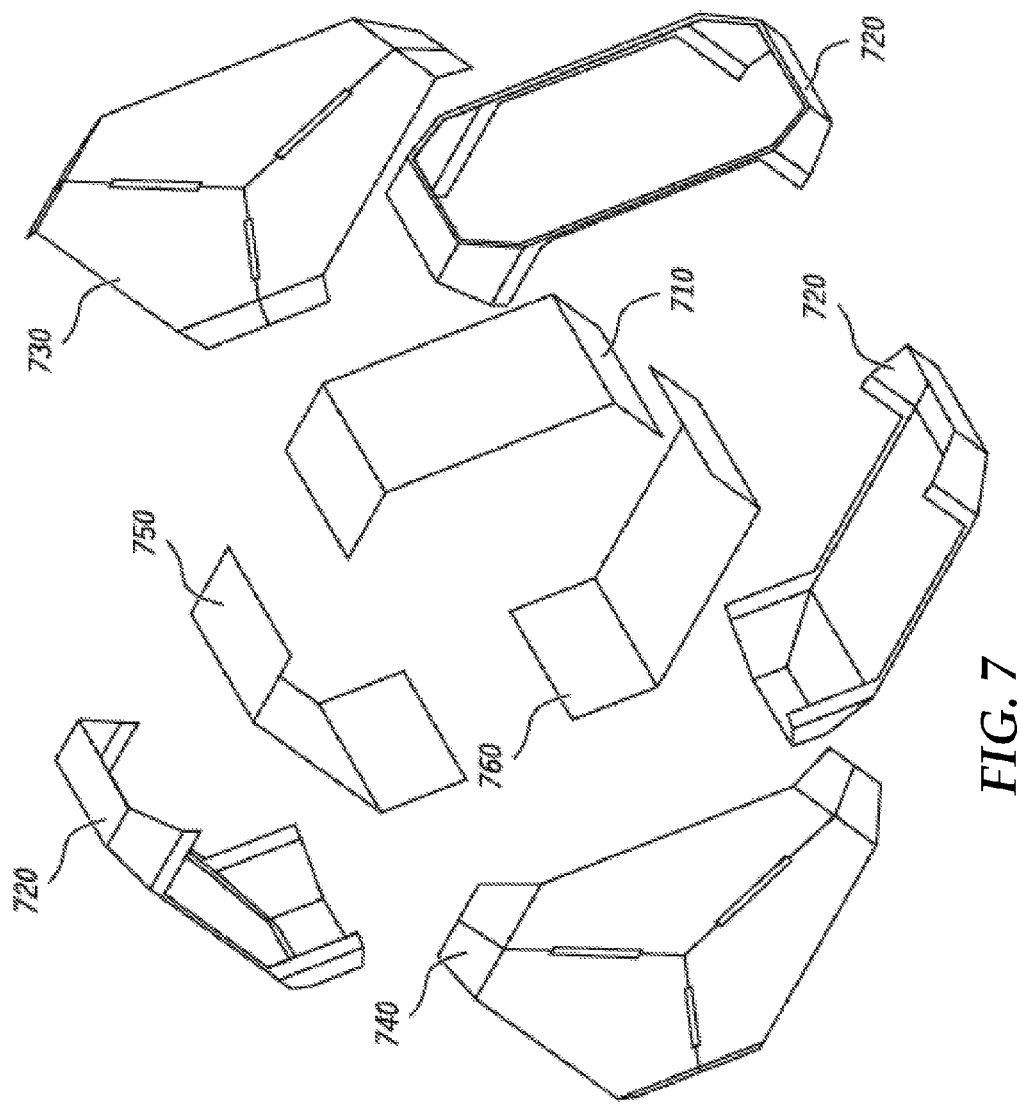
FIG. 7 is an expanded diagram illustrating components of a plastic chassis assembly of the case of the information handling system according to an embodiment of the present disclosure.

FIG. 7 is an expanded diagram illustrating components 700 of a plastic chassis assembly of a case of an information handling system. Components 700 include handle parts 720, side covers 730 and 740, and plastics 710, 750, and 760. Handle part 720 is modular and is used three times on the case. In some embodiments, each handle part 720 interlocks with its counterparts and is bolted or otherwise attached to the sheet metal chassis, covering a majority of the mechanical structure, while borrowing its rigidity once assembled. At the three vertices, the handles provide a cuff or sleeve portion that may be grasped. These portions of the handles may be used during transport and may be strong enough to support the weight of the system. With the side covers removed, the handle parts are designed in such a way that they cover a majority of the sheet metal chassis, in a very controlled manner. The sheet metal chassis is also designed to closely match the handle parts. Plastics 710, 750, and 760 may be molded, polished plastic designed to fit over the sheet metal sides of the base chassis of the information handling system, such as sides 120, 140, and 170 of FIG. 1. Side covers 730 and 740 may protect the components of information handling system from dust and moisture. A pre-loaded door mechanism may provide a rigid fit for the side covers 730 and 740.

Figure 8A:
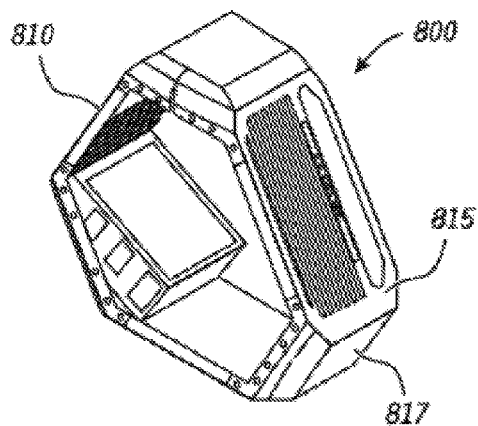
FIGS. 8A, 8B, and 8C are diagrams illustrating stages of assembly of the plastic chassis assembly of an information handling system from the base chassis according to an embodiment of the present disclosure.
Figure 8B:
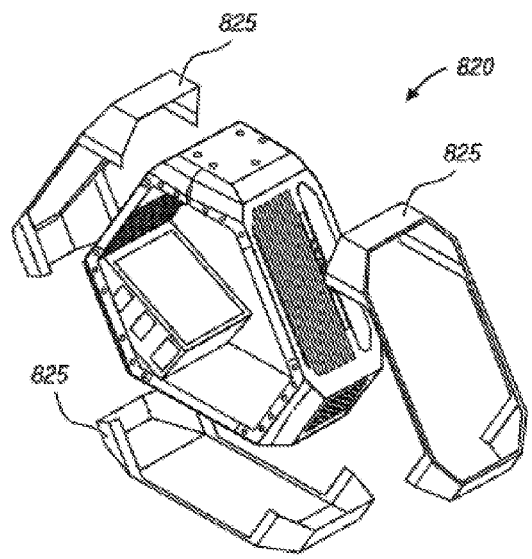
Figure 8C:
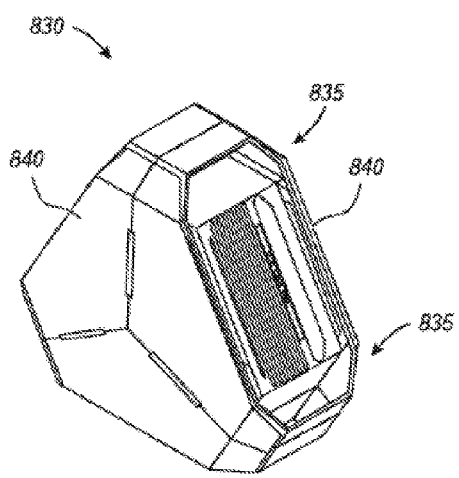

FIGS. 8A, 8B, and 8C are diagrams illustrating assembly of a case of an information handling system from its base chassis according to an embodiment of the present disclosure. Diagram 800 of FIG. 8A shows a plastic chassis assembly, which includes components 810, 815, and 817. The plastic chassis assembly may be formed by attached plastic pieces to a base chassis. The plastic pieces of the plastic chassis assembly may be plastic pieces 710, 750, and 760 of FIG. 7, and may fit over the sides of the base chassis. Component 810 shows a portion of a plastic piece added to one of the sides of the base chassis. Component 815 shows a plastic piece added to another of the sides of the base chassis. Component 817 shows a plastic piece added to one of the gussets of the base chassis.

Diagram 820 of FIG. 8B shows the addition of three handle pieces 825, such as handle pieces 720 of FIG. 7, to the base chassis and plastic chassis assembly. As shown, each handle piece 825 is attached to a side of the base chassis. The handle pieces 825 may fit together at each of the three gussets, to form a cuff for sleeve that permits a user to grasp the information handling system.

Diagram 830 of FIG. 8C shows the addition of side covers 840 to the chassis and handles. Side covers 840 may be attached at rims of a gusset. Alternatively, side covers 840 via sides of the base chassis. In some embodiments, they may be secured both at the sides and the gussets. In many embodiments, they may be locked into place by a spring and released by a latch. Component 830 includes handles 835, seen at the top and bottom. The opening in a handle provides a cuff or slot for grasping. The result of the assembly steps shown in FIG. 8 is a case of an information handling system, such as case 600 of FIG. 6.

Figure 9:
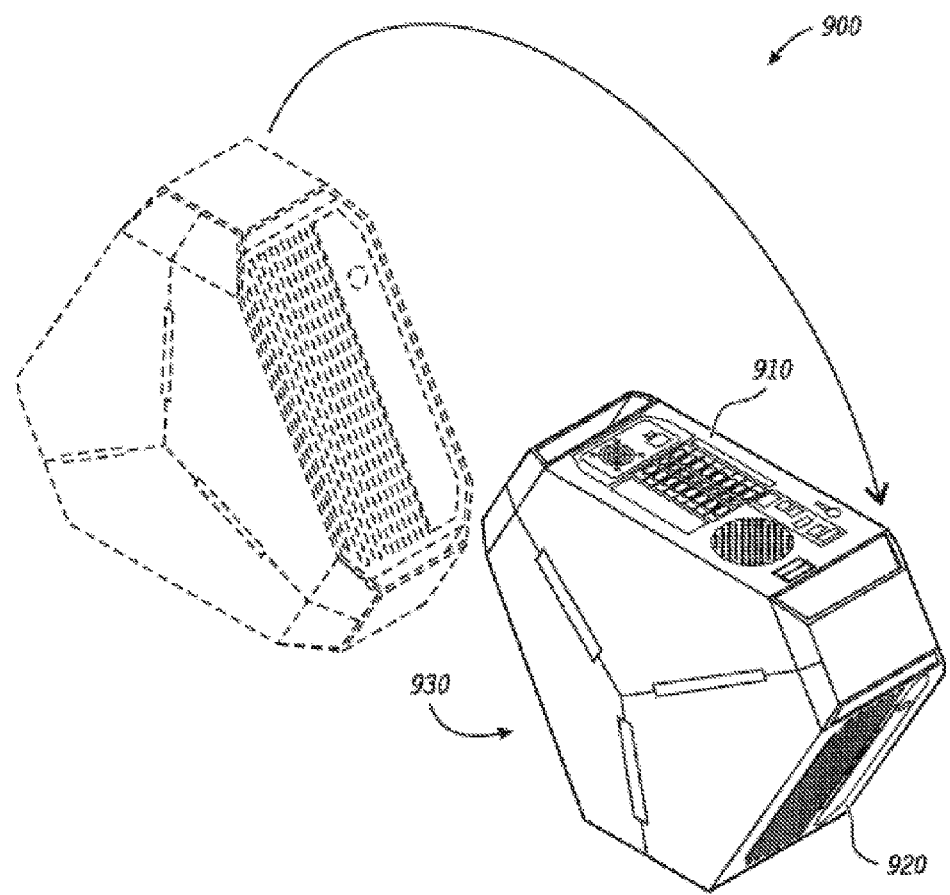
FIG. 9 illustrates rotation of a case of an information handling system according to an embodiment of the present disclosure.

FIG. 9 is illustrates rotation of a case 900 of an information handling system according to an embodiment of the present disclosure. Case 900 may be similar to case 600 of FIG. 6. Case 900 includes rear 910, front 920, and base 930. As shown in diagram 900, a forward rotation of case 900 enables access to rear 910 and any I/O ports there. The structural strength provided by the triangular sheet metal chassis may enable the rotation without any damage to internal components.

Figure 10:
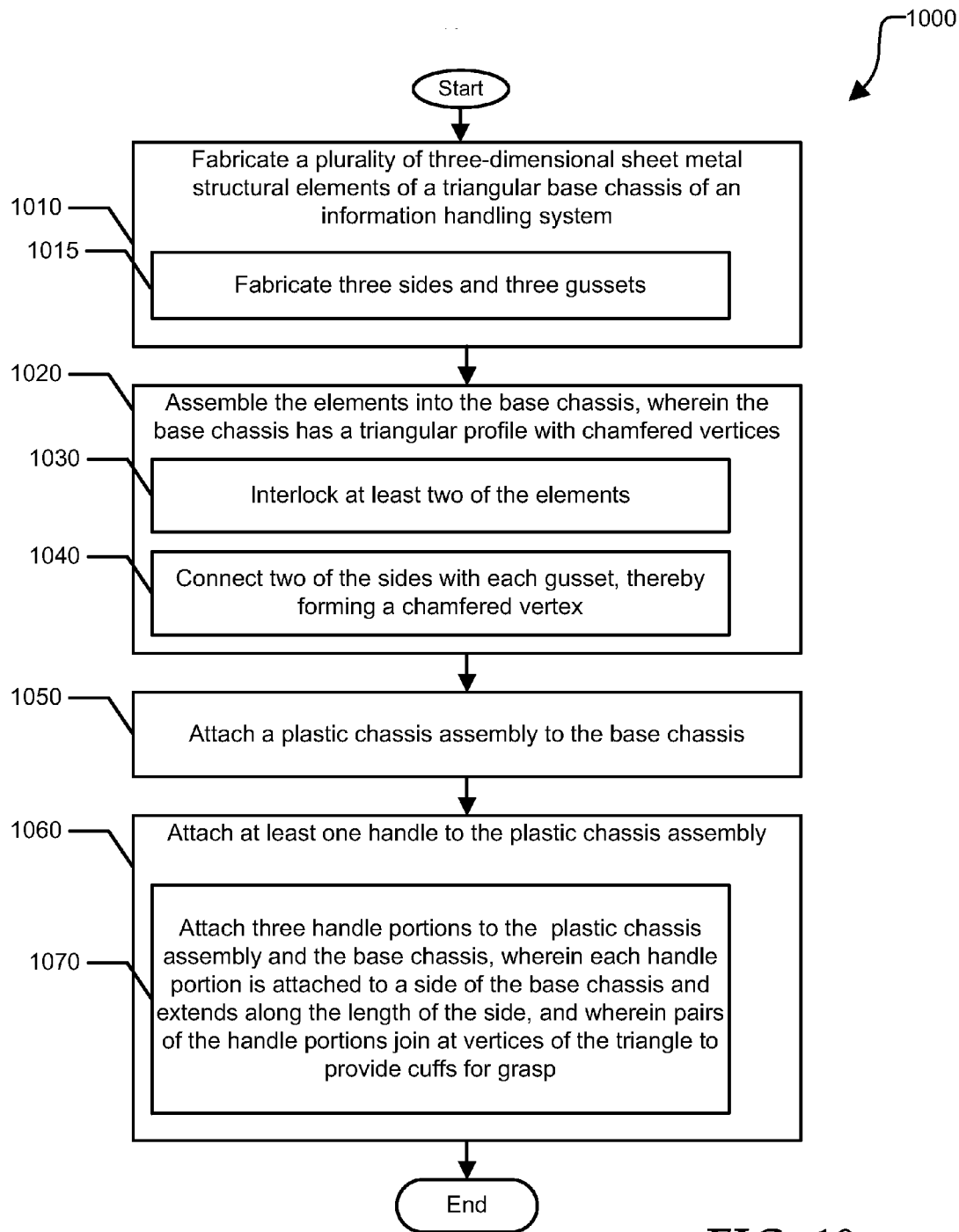
FIG. 10 is a flow diagram illustrating a method of producing a case of an information handling system according to an embodiment of the present disclosure.

FIG. 10 shows a flow diagram of a method 1000 of producing a case of an information handling system according to an embodiment of the present disclosure. At block 1010, a plurality of three-dimensional sheet metal structural elements of a triangular base chassis of an information handling systems is fabricated. The structural elements may be drawn sheet metal. Several of the structural elements may be similar in shape. In some embodiments, several copies of a general form may be fabricated and further processing may differentiate the particular structural elements. As an example, extra openings may be cut into some of the structural elements. At block 1015, the elements may include three sides of the chassis and three gussets. In some embodiments, a side may resemble side 200 of FIG. 2 and a side may resemble side 300 of FIG. 3. Other structural elements may include brackets for holding components of the information handling system, such as graphics cards and a power supply unit.

At block 1020, the structural elements are assembled into the base chassis. The base chassis has a triangular profile with chamfered vertices. At block 1030, the assembling includes interlocking at least two of the structural elements. At block 1040, the assembling includes connecting two sides with each gusset, thereby forming a chamfered vertex at the gusset. In particular, the gussets may interlock with the sides.

At block 1050, a plastic chassis assembly is attached to the base chassis. The pieces of the plastic chassis assembly may resemble elements 710, 750, and 760 of FIG. 7 and may fit over the sides. At block 1060, at least one handle is attached to the plastic chassis assembly. In the embodiment of FIG. 10, three handle portions are attached to the plastic chassis assembly and the base chassis. Each handle portion is attached to a side of the base chassis and extends along the length of the side. Pairs of the handle portions join at vertices of the triangle to provide cuffs for grasping. The shape of the handle portions may resemble elements 825 of FIG. 8 and the result of the attachment may produce handles of the shape of elements 835 of FIG. 8.

Other embodiments may include different shapes of structural elements for use in producing the chassis and different shapes of plastic pieces to produce a plastic chassis assembly. In many embodiments, fewer than three handles may be installed, and the pieces used to create the handles may differ from the pieces illustrated in FIGS. 7 and 8.

Figure 11:
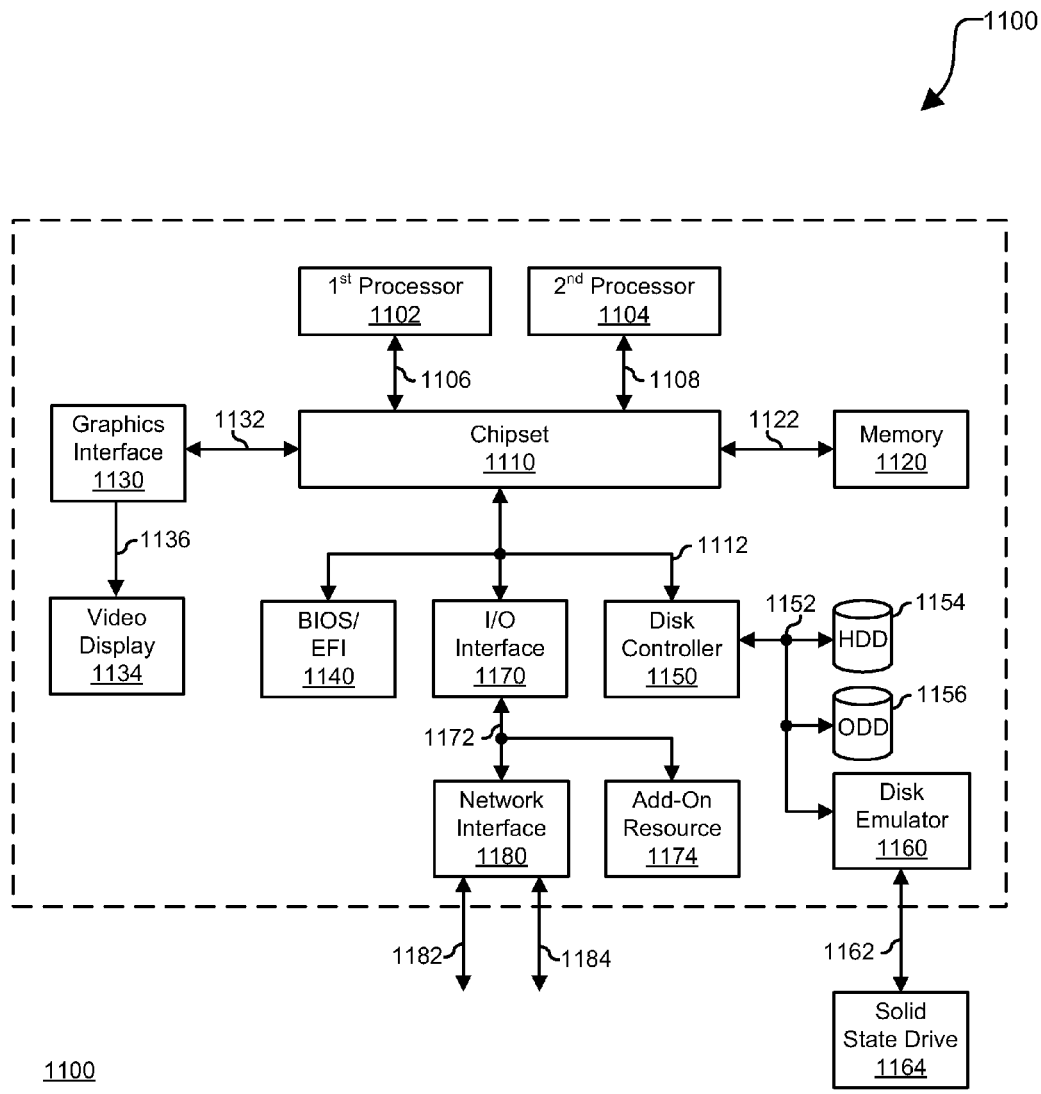
FIG. 11 is a block diagram illustrating an information handling system according to an embodiment of the present disclosure.

FIG. 11 illustrates a generalized embodiment of information handling system 1100. Information handling system 1100 can include devices or modules that embody one or more of the devices or modules described above, and operates to perform one or more of the methods described above. Information handling system 1100 includes processors 1102 and 1104, a chipset 1110, a memory 1120, a graphics interface 1130, include a basic input and output system/extensible firmware interface (BIOS/EFI) module 1140, a disk controller 1150, a disk emulator 1160, an input/output (I/O) interface 1170, and a network interface 1180. Processor 1102 is connected to chipset 1110 via processor interface 1106, and processor 1104 is connected to chipset 1110 via processor interface 1108. Memory 1120 is connected to chipset 1110 via a memory bus 1122. Graphics interface 1130 is connected to chipset 1110 via a graphics interface 1132, and provides a video display output 1136 to a video display 1134. In a particular embodiment, information handling system 1100 includes separate memories that are dedicated to each of processors 1102 and 1104 via separate memory interfaces. An example of memory 1120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 1140, disk controller 1150, and I/O interface 1170 are connected to chipset 1110 via an I/O channel 1112. An example of I/O channel 1112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 1110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 1140 includes BIOS/EFI code operable to detect resources within information handling system 1100, to provide drivers for the resources, initialize the resources, and access the resources. BIOS/EFI module 1140 includes code that operates to detect resources within information handling system 1100, to provide drivers for the resources, to initialize the resources, and to access the resources.

Disk controller 1150 includes a disk interface 1152 that connects the disc controller to a hard disk drive (HDD) 1154, to an optical disk drive (ODD) 1156, and to disk emulator 1160. An example of disk interface 1152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1160 permits a solid-state drive 1164 to be connected to information handling system 1100 via an external interface 1162. An example of external interface 1162 includes a USB interface, an IEEE 11194 (Firewire) interface, a proprietary interface, or a combination thereof.

Alternatively, solid-state drive 1164 can be disposed within information handling system 1100.

I/O interface 1170 includes a peripheral interface 1172 that connects the I/O interface to an add-on resource 1174 and to network interface 1180. Peripheral interface 1172 can be the same type of interface as I/O channel 1112, or can be a different type of interface. As such, I/O interface 1170 extends the capacity of I/O channel 1112 when peripheral interface 1172 and the I/O channel are of the same type, and the I/O interface translates information from a format suitable to the I/O channel to a format suitable to the peripheral channel 1172 when they are of a different type. Add-on resource 1174 can include a data storage system, an additional graphics interface, a network interface card (NIC), a sound/video processing card, another add-on resource, or a combination thereof. Add-on resource 1174 can be on a main circuit board, on separate circuit board or add-in card disposed within information handling system 1100, a device that is external to the information handling system, or a combination thereof.

Network interface 1180 represents a NIC disposed within information handling system 1100, on a main circuit board of the information handling system, integrated onto another component such as chipset 1110, in another suitable location, or a combination thereof. Network interface device 1180 includes network channels 1182 and 1184 that provide interfaces to devices that are external to information handling system 1100. In a particular embodiment, network channels 1182 and 1184 are of a different type than peripheral channel 1172 and network interface 1180 translates information from a format suitable to the peripheral channel to a format suitable to external devices. An example of network channels 1182 and 1184 includes InfiniBand channels, Fibre Channel channels, Gigabit Ethernet channels, proprietary channel architectures, or a combination thereof. Network channels 1182 and 1184 can be connected to external network resources (not illustrated). The network resource can include another information handling system, a data storage system, another network, a grid management system, another suitable resource, or a combination thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   fabricating a plurality of connectable three-dimensional sheet metal structural elements of a base chassis of an information handling system, wherein at least two of the sheet metal structural elements have the same shape; and
   assembling the sheet metal structural elements into the base chassis, including interlocking at least two of the sheet metal structural elements, wherein the base chassis has a triangular profile with chamfered vertices.

2. The method of claim 1, wherein the fabricating comprises:
fabricating a first sheet metal structural element from a first copy of a form; and
fabricating second sheet metal structural element from a second copy of the form, wherein the first sheet metal structural element differs from the second structural element.

3. The method of claim 1, wherein:
the plurality of three-dimensional sheet metal structural elements comprise three sides and three gussets; and
each gusset connects two of the sides, the two sides and the gusset forming a chamfered vertex.

4. The method of claim 1, further comprising attaching a plastic chassis assembly to the base chassis.

5. The method of claim 4, further comprising attaching a handle to the plastic chassis assembly.

6. The method of claim 5, wherein the attaching comprises attaching three handle portions to the plastic chassis assembly and the base chassis, wherein each handle portion is formed at a vertex of a triangle to provide cuffs for grasping.

7. An information handling system comprising:
a triangular base chassis with chamfered vertices, the base chassis comprising:
a plurality of connectable three-dimensional sheet metal structural elements, wherein at least two of the sheet metal structural elements have the same shape, the sheet metal structural elements to include a gusset, wherein the gusset is to connect two of the sheet metal structural elements, thereby forming a vertex of a triangle and the base chassis is formed by interlocking the sheet metal structural elements.

8. The information handling system of claim 7, further comprising a plastic chassis assembly to fit over the triangular base chassis.

9. The information handling system of claim 8, the plastic chassis assembly further comprising a handle to fit over a vertex of the base chassis.

10. The information handling system of claim 9, wherein the base chassis comprises rims to secure a door cover.

11. The information handling system of claim 9, wherein the base chassis comprises a handle to fit over a vertex of the base chassis.

12. The information handling system of claim 10, wherein the rims extend from the gussets.

13. The information handling system of claim 7, wherein the sheet metal structural elements further comprise mounting for components of the information handling system.

14. A base chassis of an information handling system comprising:
a plurality of connectable three-dimensional sheet metal structural elements, wherein at least two of the sheet metal structural elements have the same shape; and
a gusset, wherein:
the base chassis is formed by connecting the sheet metal structural elements;
the gusset connects two of the sheet metal structural elements; and
the base chassis has a generally triangular profile.

15. The base chassis of claim 14, wherein the three-dimensional sheet metal structural elements include a first structural element produced from a first copy of a form and a second sheet metal structural element produced from a second copy of the form, wherein the first sheet metal structural element differs from the second sheet metal structural element.

16. The base chassis of claim 14, wherein the generally triangular profile is equilateral.

17. The base chassis of claim 14, further comprising a handle.

18. The base chassis of claim 17, wherein the handle is located at a vertex of the base chassis.

19. The base chassis of claim 18, wherein the handle comprises a handle portion, wherein the handle portion is attached to a side of the base chassis and extends along the length of the side, and wherein the handle portion joins at vertices of the triangle to provide cuffs for grasping.

20. The base chassis of claim 19, further comprising three handle portions, wherein each handle portion is attached to a side of the base chassis and extends along the length of the side, and wherein pairs of the handle portions join at vertices of the triangle to provide cuffs for grasping.

* * * * *